(12) United States Patent
Ajan et al.

(10) Patent No.: US 9,269,480 B1
(45) Date of Patent: Feb. 23, 2016

(54) SYSTEMS AND METHODS FOR FORMING MAGNETIC RECORDING MEDIA WITH IMPROVED GRAIN COLUMNAR GROWTH FOR ENERGY ASSISTED MAGNETIC RECORDING

(75) Inventors: Antony Ajan, Santa Clara, CA (US); Alexander Chernyshov, San Jose, CA (US); Hua Yuan, Fremont, CA (US); B. Ramamurthy Acharya, Fremont, CA (US)

(73) Assignee: WD Media, LLC, San Jose, CA (US)

( * ) Notice: Subject to any disclaimer, the term of this patent is extended or adjusted under 35 U.S.C. 154(b) by 23 days.

(21) Appl. No.: 13/436,596

(22) Filed: Mar. 30, 2012

(51) Int. Cl.
*H01F 1/00* (2006.01)

(52) U.S. Cl.
CPC .................................. *H01F 1/0027* (2013.01)

(58) Field of Classification Search
CPC ........... G11B 5/65; G11B 5/84; H01F 1/0027
USPC ................. 427/127, 128, 129, 130, 131, 132; 428/800, 827; 216/22, 76, 75
See application file for complete search history.

(56) References Cited

U.S. PATENT DOCUMENTS

| | | | |
|---|---|---|---|
| 5,603,766 A | 2/1997 | Visokay et al. | |
| 5,824,409 A | 10/1998 | Sellmyer et al. | |
| 6,007,623 A | 12/1999 | Thiele et al. | |
| 6,013,161 A | 1/2000 | Chen et al. | |
| 6,063,248 A | 5/2000 | Bourez et al. | |
| 6,068,891 A | 5/2000 | O'Dell et al. | |
| 6,086,730 A | 7/2000 | Liu et al. | |
| 6,086,974 A | 7/2000 | Thiele et al. | |
| 6,099,981 A | 8/2000 | Nishimori | |
| 6,103,404 A | 8/2000 | Ross et al. | |
| 6,117,499 A | 9/2000 | Wong et al. | |
| 6,136,403 A | 10/2000 | Prabhakara et al. | |
| 6,139,907 A | 10/2000 | Sellmyer et al. | |
| 6,143,375 A | 11/2000 | Ross et al. | |
| 6,145,849 A | 11/2000 | Bae et al. | |
| 6,146,737 A | 11/2000 | Malhotra et al. | |
| 6,149,696 A | 11/2000 | Jia | |
| 6,150,015 A | 11/2000 | Bertero et al. | |
| 6,156,404 A | 12/2000 | Ross et al. | |
| 6,159,076 A | 12/2000 | Sun et al. | |
| 6,164,118 A | 12/2000 | Suzuki et al. | |
| 6,183,606 B1 | 2/2001 | Kuo et al. | |

(Continued)

FOREIGN PATENT DOCUMENTS

WO    2008030199    3/2008

OTHER PUBLICATIONS

J.S. Chen, et al., "High coercive L10 FePt-C (001) nanocomopsite films with small grain size for perpendicular recording media", JAP, 103, 07F517 (2008).

(Continued)

*Primary Examiner* — Michael Cleveland
*Assistant Examiner* — Tabassom Tadayyon Eslami

(57) ABSTRACT

Systems and methods for forming magnetic recording media with improved columnar growth for energy assisted magnetic recording are provided. In one such method, a first sub-layer of a magnetic layer is formed on a substrate, the magnetic layer including a magnetic material and a plurality of non-magnetic segregants, a top surface of the first sub-layer is etched to substantially remove the non-magnetic segregants accumulated on the top surface, and a second sub-layer of the magnetic layer is formed on the first sub-layer.

19 Claims, 2 Drawing Sheets

(56) References Cited

U.S. PATENT DOCUMENTS

| | | | |
|---|---|---|---|
| 6,183,893 B1* | 2/2001 | Futamoto et al. | 428/831.2 |
| 6,200,441 B1 | 3/2001 | Gornicki et al. | |
| 6,204,995 B1 | 3/2001 | Hokkyo et al. | |
| 6,206,765 B1 | 3/2001 | Sanders et al. | |
| 6,210,819 B1 | 4/2001 | Lal et al. | |
| 6,216,709 B1 | 4/2001 | Fung et al. | |
| 6,221,119 B1 | 4/2001 | Homola | |
| 6,248,395 B1 | 6/2001 | Homola et al. | |
| 6,261,681 B1 | 7/2001 | Suekane et al. | |
| 6,270,885 B1 | 8/2001 | Hokkyo et al. | |
| 6,274,063 B1 | 8/2001 | Li et al. | |
| 6,283,838 B1 | 9/2001 | Blake et al. | |
| 6,287,429 B1 | 9/2001 | Moroishi et al. | |
| 6,290,573 B1 | 9/2001 | Suzuki | |
| 6,299,947 B1 | 10/2001 | Suzuki et al. | |
| 6,303,217 B1 | 10/2001 | Malhotra et al. | |
| 6,309,765 B1 | 10/2001 | Suekane et al. | |
| 6,358,636 B1 | 3/2002 | Yang et al. | |
| 6,362,452 B1 | 3/2002 | Suzuki et al. | |
| 6,363,599 B1 | 4/2002 | Bajorek | |
| 6,365,012 B1 | 4/2002 | Sato et al. | |
| 6,381,090 B1 | 4/2002 | Suzuki et al. | |
| 6,381,092 B1 | 4/2002 | Suzuki | |
| 6,387,483 B1 | 5/2002 | Hokkyo et al. | |
| 6,391,213 B1 | 5/2002 | Homola | |
| 6,395,349 B1 | 5/2002 | Salamon | |
| 6,403,919 B1 | 6/2002 | Salamon | |
| 6,408,677 B1 | 6/2002 | Suzuki | |
| 6,426,157 B1 | 7/2002 | Hokkyo et al. | |
| 6,429,984 B1 | 8/2002 | Alex | |
| 6,482,330 B1 | 11/2002 | Bajorek | |
| 6,482,505 B1 | 11/2002 | Bertero et al. | |
| 6,500,567 B1 | 12/2002 | Bertero et al. | |
| 6,528,124 B1 | 3/2003 | Nguyen | |
| 6,548,821 B1 | 4/2003 | Treves et al. | |
| 6,552,871 B2 | 4/2003 | Suzuki et al. | |
| 6,565,719 B1 | 5/2003 | Lairson et al. | |
| 6,566,674 B1 | 5/2003 | Treves et al. | |
| 6,571,806 B2 | 6/2003 | Rosano et al. | |
| 6,599,646 B2 | 7/2003 | Suzuki et al. | |
| 6,628,466 B2 | 9/2003 | Alex | |
| 6,664,503 B1 | 12/2003 | Hsieh et al. | |
| 6,670,055 B2 | 12/2003 | Tomiyasu et al. | |
| 6,682,807 B2 | 1/2004 | Lairson et al. | |
| 6,683,754 B2 | 1/2004 | Suzuki et al. | |
| 6,716,516 B2 | 4/2004 | Futamoto et al. | |
| 6,730,420 B1 | 5/2004 | Bertero et al. | |
| 6,743,528 B2 | 6/2004 | Suekane et al. | |
| 6,759,138 B2 | 7/2004 | Tomiyasu et al. | |
| 6,778,353 B1 | 8/2004 | Harper | |
| 6,795,274 B1 | 9/2004 | Hsieh et al. | |
| 6,824,817 B2 | 11/2004 | Araki et al. | |
| 6,846,583 B2 | 1/2005 | Inaba et al. | |
| 6,855,232 B2 | 2/2005 | Jairson et al. | |
| 6,857,937 B2 | 2/2005 | Bajorek | |
| 6,893,748 B2 | 5/2005 | Bertero et al. | |
| 6,899,959 B2 | 5/2005 | Bertero et al. | |
| 6,916,558 B2 | 7/2005 | Umezawa et al. | |
| 6,939,120 B1 | 9/2005 | Harper | |
| 6,946,191 B2 | 9/2005 | Morikawa et al. | |
| 6,967,798 B2 | 11/2005 | Homola et al. | |
| 6,972,135 B2 | 12/2005 | Homola | |
| 7,004,827 B1 | 2/2006 | Suzuki et al. | |
| 7,006,323 B1 | 2/2006 | Suzuki | |
| 7,016,154 B2 | 3/2006 | Nishihira | |
| 7,019,924 B2 | 3/2006 | McNeil et al. | |
| 7,045,215 B2 | 5/2006 | Shimokawa | |
| 7,070,870 B2 | 7/2006 | Bertero et al. | |
| 7,090,934 B2 | 8/2006 | Hokkyo et al. | |
| 7,099,112 B1 | 8/2006 | Harper | |
| 7,105,241 B2 | 9/2006 | Shimokawa et al. | |
| 7,119,990 B2 | 10/2006 | Bajorek et al. | |
| 7,147,790 B2 | 12/2006 | Wachenschwanz et al. | |
| 7,161,753 B2 | 1/2007 | Wachenschwanz et al. | |
| 7,166,319 B2 | 1/2007 | Ishiyama | |
| 7,166,374 B2 | 1/2007 | Suekane et al. | |
| 7,169,487 B2 | 1/2007 | Kawai et al. | |
| 7,174,775 B2 | 2/2007 | Ishiyama | |
| 7,179,549 B2 | 2/2007 | Malhotra et al. | |
| 7,184,139 B2 | 2/2007 | Treves et al. | |
| 7,196,860 B2 | 3/2007 | Alex | |
| 7,199,977 B2 | 4/2007 | Suzuki et al. | |
| 7,208,236 B2 | 4/2007 | Morikawa et al. | |
| 7,220,500 B1 | 5/2007 | Tomiyasu et al. | |
| 7,229,266 B2 | 6/2007 | Harper | |
| 7,239,970 B2 | 7/2007 | Treves et al. | |
| 7,241,520 B2 | 7/2007 | Shin et al. | |
| 7,252,897 B2 | 8/2007 | Shimokawa et al. | |
| 7,277,254 B2 | 10/2007 | Shimokawa et al. | |
| 7,281,920 B2 | 10/2007 | Homola et al. | |
| 7,282,278 B1 | 10/2007 | Nolan | |
| 7,286,324 B2 | 10/2007 | Yasui et al. | |
| 7,292,329 B2 | 11/2007 | Treves et al. | |
| 7,301,726 B1 | 11/2007 | Suzuki | |
| 7,302,148 B2 | 11/2007 | Treves et al. | |
| 7,305,119 B2 | 12/2007 | Treves et al. | |
| 7,314,404 B2 | 1/2008 | Singh et al. | |
| 7,320,584 B1 | 1/2008 | Harper et al. | |
| 7,329,114 B2 | 2/2008 | Harper et al. | |
| 7,375,362 B2 | 5/2008 | Treves et al. | |
| 7,420,886 B2 | 9/2008 | Tomiyasu et al. | |
| 7,425,719 B2 | 9/2008 | Treves et al. | |
| 7,471,484 B2 | 12/2008 | Wachenschwanz et al. | |
| 7,498,062 B2 | 3/2009 | Calcaterra et al. | |
| 7,531,485 B2 | 5/2009 | Hara et al. | |
| 7,537,846 B2 | 5/2009 | Ishiyama et al. | |
| 7,549,209 B2 | 6/2009 | Wachenschwanz et al. | |
| 7,569,490 B2 | 8/2009 | Staud | |
| 7,597,792 B2 | 10/2009 | Homola et al. | |
| 7,597,973 B2 | 10/2009 | Ishiyama | |
| 7,608,193 B2 | 10/2009 | Wachenschwanz et al. | |
| 7,632,087 B2 | 12/2009 | Homola | |
| 7,656,615 B2 | 2/2010 | Wachenschwanz et al. | |
| 7,682,546 B2 | 3/2010 | Harper | |
| 7,684,152 B2 | 3/2010 | Suzuki et al. | |
| 7,686,606 B2 | 3/2010 | Harper et al. | |
| 7,686,991 B2 | 3/2010 | Harper | |
| 7,695,833 B2 | 4/2010 | Ishiyama | |
| 7,722,968 B2 | 5/2010 | Ishiyama | |
| 7,733,605 B2 | 6/2010 | Suzuki et al. | |
| 7,736,768 B2 | 6/2010 | Ishiyama | |
| 7,755,861 B1 | 7/2010 | Li et al. | |
| 7,758,732 B1 | 7/2010 | Calcaterra et al. | |
| 7,833,639 B2 | 11/2010 | Sonobe et al. | |
| 7,833,641 B2 | 11/2010 | Tomiyasu et al. | |
| 7,910,159 B2 | 3/2011 | Jung | |
| 7,911,736 B2 | 3/2011 | Bajorek | |
| 7,924,519 B2 | 4/2011 | Lambert | |
| 7,944,165 B1 | 5/2011 | O'Dell | |
| 7,944,643 B1 | 5/2011 | Jiang et al. | |
| 7,955,723 B2 | 6/2011 | Umezawa et al. | |
| 7,983,003 B2 | 7/2011 | Sonobe et al. | |
| 7,993,497 B2 | 8/2011 | Moroishi et al. | |
| 7,993,765 B2 | 8/2011 | Kim et al. | |
| 7,998,912 B2 | 8/2011 | Chen et al. | |
| 8,002,901 B1 | 8/2011 | Chen et al. | |
| 8,003,237 B2 | 8/2011 | Sonobe et al. | |
| 8,012,920 B2 | 9/2011 | Shimokawa | |
| 8,038,863 B2 | 10/2011 | Homola | |
| 8,057,926 B2 | 11/2011 | Ayama et al. | |
| 8,062,778 B2 | 11/2011 | Suzuki et al. | |
| 8,064,156 B1 | 11/2011 | Suzuki et al. | |
| 8,076,013 B2 | 12/2011 | Sonobe et al. | |
| 8,092,931 B2 | 1/2012 | Ishiyama et al. | |
| 8,100,685 B1 | 1/2012 | Harper et al. | |
| 8,101,054 B2 | 1/2012 | Chen et al. | |
| 8,125,723 B1 | 2/2012 | Nichols et al. | |
| 8,125,724 B1 | 2/2012 | Nichols et al. | |
| 8,137,517 B1 | 3/2012 | Bourez | |
| 8,142,916 B2 | 3/2012 | Umezawa et al. | |
| 8,163,093 B1 | 4/2012 | Chen et al. | |
| 8,171,949 B1 | 5/2012 | Lund et al. | |
| 8,173,282 B1* | 5/2012 | Sun et al. | 428/831 |
| 8,178,480 B2 | 5/2012 | Hamakubo et al. | |

(56) References Cited

U.S. PATENT DOCUMENTS

| | | |
|---|---|---|
| 8,206,789 B2 | 6/2012 | Suzuki |
| 8,218,260 B2 | 7/2012 | Iamratanakul et al. |
| 8,247,095 B2 | 8/2012 | Champion et al. |
| 8,257,783 B2 | 9/2012 | Suzuki et al. |
| 8,268,462 B2 | 9/2012 | Peng et al. |
| 8,298,609 B1 | 10/2012 | Liew et al. |
| 8,298,689 B2 | 10/2012 | Sonobe et al. |
| 8,309,239 B2 | 11/2012 | Umezawa et al. |
| 8,316,668 B1 | 11/2012 | Chan et al. |
| 8,331,056 B2 | 12/2012 | O'Dell |
| 8,354,618 B1 | 1/2013 | Chen et al. |
| 8,367,228 B2 | 2/2013 | Sonobe et al. |
| 8,383,209 B2 | 2/2013 | Ayama |
| 8,394,243 B1 | 3/2013 | Jung et al. |
| 8,397,751 B1 | 3/2013 | Chan et al. |
| 8,399,809 B1 | 3/2013 | Bourez |
| 8,402,638 B1 | 3/2013 | Treves et al. |
| 8,404,056 B1 | 3/2013 | Chen et al. |
| 8,404,369 B2 | 3/2013 | Ruffini et al. |
| 8,404,370 B2 | 3/2013 | Sato et al. |
| 8,406,918 B2 | 3/2013 | Tan et al. |
| 8,414,966 B2 | 4/2013 | Yasumori et al. |
| 8,425,975 B2 | 4/2013 | Ishiyama |
| 8,431,257 B2 | 4/2013 | Kim et al. |
| 8,431,258 B2 | 4/2013 | Onoue et al. |
| 8,453,315 B2 | 6/2013 | Kajiwara et al. |
| 8,488,276 B1 | 7/2013 | Jung et al. |
| 8,491,800 B1 | 7/2013 | Dorsey |
| 8,492,009 B1 | 7/2013 | Homola et al. |
| 8,492,011 B2 | 7/2013 | Itoh et al. |
| 8,496,466 B1 | 7/2013 | Treves et al. |
| 8,517,364 B1 | 8/2013 | Crumley et al. |
| 8,517,657 B2 | 8/2013 | Chen et al. |
| 8,524,052 B1 | 9/2013 | Tan et al. |
| 8,530,065 B1 | 9/2013 | Chernyshov et al. |
| 8,546,000 B2 | 10/2013 | Umezawa |
| 8,551,253 B2 | 10/2013 | Na'Im et al. |
| 8,551,627 B2 | 10/2013 | Shimada et al. |
| 8,556,566 B1 | 10/2013 | Suzuki et al. |
| 8,559,131 B2 | 10/2013 | Masuda et al. |
| 8,562,748 B1 | 10/2013 | Chen et al. |
| 8,565,050 B1 | 10/2013 | Bertero et al. |
| 8,570,844 B1 | 10/2013 | Yuan et al. |
| 8,580,410 B2 | 11/2013 | Onoue |
| 8,584,687 B1 | 11/2013 | Chen et al. |
| 8,591,709 B1 | 11/2013 | Lim et al. |
| 8,592,061 B2 | 11/2013 | Onoue et al. |
| 8,596,287 B1 | 12/2013 | Chen et al. |
| 8,597,723 B1 | 12/2013 | Jung et al. |
| 8,603,649 B2 | 12/2013 | Onoue |
| 8,603,650 B2 | 12/2013 | Sonobe et al. |
| 8,605,388 B2 | 12/2013 | Yasumori et al. |
| 8,605,555 B1 | 12/2013 | Chernyshov et al. |
| 8,608,147 B1 | 12/2013 | Yap et al. |
| 8,609,263 B1 | 12/2013 | Chernyshov et al. |
| 8,619,381 B2 | 12/2013 | Moser et al. |
| 8,623,528 B2 | 1/2014 | Umezawa et al. |
| 8,623,529 B2 | 1/2014 | Suzuki |
| 8,634,155 B2 | 1/2014 | Yasumori et al. |
| 8,658,003 B1 | 2/2014 | Bourez |
| 8,658,292 B1 | 2/2014 | Mallary et al. |
| 8,665,541 B2 | 3/2014 | Saito |
| 8,668,953 B1 | 3/2014 | Buechel-Rimmel |
| 8,674,327 B1 | 3/2014 | Poon et al. |
| 8,685,214 B1 | 4/2014 | Moh et al. |
| 8,696,404 B2 | 4/2014 | Sun et al. |
| 8,711,499 B1 | 4/2014 | Desai et al. |
| 8,743,666 B1 | 6/2014 | Bertero et al. |
| 8,758,912 B2 | 6/2014 | Srinivasan et al. |
| 8,787,124 B1 | 7/2014 | Chernyshov et al. |
| 8,787,130 B1 | 7/2014 | Yuan et al. |
| 8,791,391 B2 | 7/2014 | Bourez |
| 8,795,765 B2 | 8/2014 | Koike et al. |
| 8,795,790 B2 | 8/2014 | Sonobe et al. |
| 8,795,857 B2 | 8/2014 | Ayama et al. |
| 8,800,322 B1 | 8/2014 | Chan et al. |
| 8,811,129 B1 | 8/2014 | Yuan et al. |
| 8,817,410 B1 | 8/2014 | Moser et al. |
| 2002/0041980 A1 | 4/2002 | Suzuki et al. |
| 2002/0060883 A1 | 5/2002 | Suzuki |
| 2003/0022024 A1 | 1/2003 | Wachenschwanz |
| 2003/0053238 A1* | 3/2003 | Kai et al. ............... 360/59 |
| 2004/0022387 A1 | 2/2004 | Weikle |
| 2004/0110035 A1* | 6/2004 | Shin et al. ............... 428/694 T |
| 2004/0132301 A1 | 7/2004 | Harper et al. |
| 2004/0161638 A1 | 8/2004 | Maeda et al. |
| 2004/0185307 A1 | 9/2004 | Oikawa et al. |
| 2004/0191578 A1 | 9/2004 | Chen et al. |
| 2004/0202793 A1 | 10/2004 | Harper et al. |
| 2004/0202865 A1 | 10/2004 | Homola et al. |
| 2004/0209123 A1 | 10/2004 | Bajorek et al. |
| 2004/0209470 A1 | 10/2004 | Bajorek |
| 2005/0036223 A1 | 2/2005 | Wachenschwanz et al. |
| 2005/0142990 A1 | 6/2005 | Homola |
| 2005/0150862 A1 | 7/2005 | Harper et al. |
| 2005/0151282 A1 | 7/2005 | Harper et al. |
| 2005/0151283 A1 | 7/2005 | Bajorek et al. |
| 2005/0151300 A1 | 7/2005 | Harper et al. |
| 2005/0155554 A1 | 7/2005 | Saito |
| 2005/0167867 A1 | 8/2005 | Bajorek et al. |
| 2005/0263401 A1 | 12/2005 | Olsen et al. |
| 2006/0147758 A1 | 7/2006 | Jung et al. |
| 2006/0181697 A1 | 8/2006 | Treves et al. |
| 2006/0188743 A1 | 8/2006 | Seki et al. |
| 2006/0207890 A1 | 9/2006 | Staud |
| 2006/0222903 A1 | 10/2006 | Ichihara et al. |
| 2007/0026262 A1 | 2/2007 | Maeda |
| 2007/0070549 A1 | 3/2007 | Suzuki et al. |
| 2007/0072011 A1 | 3/2007 | Li et al. |
| 2007/0187227 A1* | 8/2007 | Marinero ............... 204/192.2 |
| 2007/0245909 A1 | 10/2007 | Homola |
| 2007/0292720 A1 | 12/2007 | Suess |
| 2008/0037171 A1 | 2/2008 | Mukherjee et al. |
| 2008/0075845 A1 | 3/2008 | Sonobe et al. |
| 2008/0093760 A1 | 4/2008 | Harper et al. |
| 2008/0311430 A1 | 12/2008 | Chen et al. |
| 2009/0117408 A1 | 5/2009 | Umezawa et al. |
| 2009/0136784 A1 | 5/2009 | Suzuki et al. |
| 2009/0169922 A1 | 7/2009 | Ishiyama |
| 2009/0191331 A1 | 7/2009 | Umezawa et al. |
| 2009/0202866 A1 | 8/2009 | Kim et al. |
| 2009/0226762 A1* | 9/2009 | Hellwig et al. ............... 428/815 |
| 2009/0311557 A1 | 12/2009 | Onoue et al. |
| 2010/0110576 A1* | 5/2010 | Akagi et al. ............... 360/59 |
| 2010/0143752 A1 | 6/2010 | Ishibashi et al. |
| 2010/0190035 A1 | 7/2010 | Sonobe et al. |
| 2010/0196619 A1 | 8/2010 | Ishiyama |
| 2010/0196740 A1 | 8/2010 | Ayama et al. |
| 2010/0209601 A1 | 8/2010 | Shimokawa et al. |
| 2010/0215992 A1 | 8/2010 | Horikawa et al. |
| 2010/0232065 A1 | 9/2010 | Suzuki et al. |
| 2010/0247965 A1 | 9/2010 | Onoue |
| 2010/0261039 A1 | 10/2010 | Itoh et al. |
| 2010/0276272 A1* | 11/2010 | Zheng et al. ............... 204/192.11 |
| 2010/0279151 A1 | 11/2010 | Sakamoto et al. |
| 2010/0300884 A1 | 12/2010 | Homola et al. |
| 2010/0304186 A1 | 12/2010 | Shimokawa |
| 2011/0097603 A1* | 4/2011 | Onoue ............... G11B 5/65 428/827 |
| 2011/0097604 A1 | 4/2011 | Onoue |
| 2011/0171495 A1 | 7/2011 | Tachibana et al. |
| 2011/0206947 A1 | 8/2011 | Tachibana et al. |
| 2011/0212346 A1 | 9/2011 | Onoue et al. |
| 2011/0223446 A1 | 9/2011 | Onoue et al. |
| 2011/0244119 A1 | 10/2011 | Umezawa et al. |
| 2011/0299194 A1 | 12/2011 | Aniya et al. |
| 2011/0311841 A1 | 12/2011 | Saito et al. |
| 2012/0028078 A1 | 2/2012 | Li et al. |
| 2012/0069466 A1 | 3/2012 | Okamoto et al. |
| 2012/0070692 A1 | 3/2012 | Sato et al. |
| 2012/0077060 A1 | 3/2012 | Ozawa |
| 2012/0127599 A1 | 5/2012 | Shimokawa et al. |
| 2012/0127601 A1 | 5/2012 | Suzuki et al. |
| 2012/0129009 A1 | 5/2012 | Sato et al. |

(56) References Cited

U.S. PATENT DOCUMENTS

| | | |
|---|---|---|
| 2012/0140359 A1 | 6/2012 | Tachibana |
| 2012/0141833 A1 | 6/2012 | Umezawa et al. |
| 2012/0141835 A1 | 6/2012 | Sakamoto |
| 2012/0148875 A1 | 6/2012 | Hamakubo et al. |
| 2012/0156523 A1 | 6/2012 | Seki et al. |
| 2012/0164488 A1 | 6/2012 | Shin et al. |
| 2012/0170152 A1 | 7/2012 | Sonobe et al. |
| 2012/0171369 A1 | 7/2012 | Koike et al. |
| 2012/0175243 A1 | 7/2012 | Fukuura et al. |
| 2012/0189872 A1 | 7/2012 | Umezawa et al. |
| 2012/0196049 A1 | 8/2012 | Azuma et al. |
| 2012/0207919 A1 | 8/2012 | Sakamoto et al. |
| 2012/0214021 A1* | 8/2012 | Sayama et al. ........... 428/836.1 |
| 2012/0225217 A1 | 9/2012 | Itoh et al. |
| 2012/0251842 A1 | 10/2012 | Yuan et al. |
| 2012/0251846 A1 | 10/2012 | Desai et al. |
| 2012/0276417 A1 | 11/2012 | Shimokawa et al. |
| 2012/0308722 A1 | 12/2012 | Suzuki et al. |
| 2013/0040167 A1 | 2/2013 | Alagarsamy et al. |
| 2013/0071694 A1 | 3/2013 | Srinivasan et al. |
| 2013/0165029 A1 | 6/2013 | Sun et al. |
| 2013/0175252 A1 | 7/2013 | Bourez |
| 2013/0216865 A1 | 8/2013 | Yasumori et al. |
| 2013/0230647 A1 | 9/2013 | Onoue et al. |
| 2013/0314815 A1 | 11/2013 | Yuan et al. |
| 2014/0011054 A1 | 1/2014 | Suzuki |
| 2014/0044992 A1 | 2/2014 | Onoue |
| 2014/0050843 A1 | 2/2014 | Yi et al. |
| 2014/0151360 A1 | 6/2014 | Gregory et al. |
| 2014/0234666 A1 | 8/2014 | Knigge et al. |

OTHER PUBLICATIONS

Li Zhang et al., "L10-ordered high coercivity (FePt) Ag-C granular thin films for perpendicular recording", JMMM 322 (2010) 2658-2664.

Dieter Weller, et al., "High Ku Materials Approach to 100 Gbits/in2", IEEE Transactions on Magnetics, vol. 36, No. 1, Jan. 2000, pp. 10-15.

Hu, et al. "Exchange Coupling Assisted FePtC Perpendicular Recording Media", App.Phys.Let.93, 072504 (2008), 3 pages.

Hua Yuan, et al., U.S. Appl. No. 12/860,616, filed Aug. 20, 2010, 27 pages.

Chengjun Sun, et al., U.S. Appl. No. 12/625,504, filed Nov. 24, 2009, 27 pages.

Hua Yuan, et al., U.S. Appl. No. 12/850,951, filed Aug. 5, 2010, 19 pages.

* cited by examiner

SYSTEMS AND METHODS FOR FORMING MAGNETIC RECORDING MEDIA WITH IMPROVED GRAIN COLUMNAR GROWTH FOR ENERGY ASSISTED MAGNETIC RECORDING

FIELD

Aspects of the present invention relate to heat assisted or energy assisted magnetic recording, and, more particularly, systems and methods for forming magnetic recording media with improved columnar growth for heat assisted or energy assisted magnetic recording.

BACKGROUND

Due to the increasing demand for more data storage, heat assisted or energy assisted magnetic recording concepts have been pursued as ways to achieve higher density magnetic recording well over a Terabit/in$^2$ in media design. Among the many available magnetic materials, FePt is often chosen as one of the suitable materials for a magnetic recording layer. This material is shown to have a desired thermal gradient near the Curie point for heat assisted magnetic recording.

To achieve magnetic material (e.g., FePt, FePd) with high densities, non-magnetic segregants (e.g., C, Cr, B, $SiO_2$, $TiO_2$, $Cr_2O_3$, Ag, BN, $V_2O_5$, $ZrO_2$, $Nb_2O_5$, $HfO_2$, $Ta_2O_5$, $WO_3$, MgO, $B_2O_3$, ZnO, etc.) can be added in order to attain smaller grain sizes of the magnetic material with sufficiently low grain size distributions (e.g., <20%). Carbon has been found to be one of the effective additives which shows the above mentioned properties. However, as the grain sizes get smaller, it becomes difficult to make the magnetic recording layer thicker. For example, in an FePt—C system, a ratio t/D (where t is the thickness, and D is the grain diameter) is found to be limited to approximately 1. This leads to severe reduction in read-back amplitude and hence poor recording performance at high densities. Therefore, it is desirable to improve the performance of existing magnetic recording layers and methods for forming the same.

SUMMARY

Embodiments of the present invention are directed to magnetic recording media with improved columnar growth of the magnetic grains. Embodiments of the present invention are also directed to methods for forming the improved magnetic recording media.

According to an embodiment of the present invention, a method for fabricating a magnetic recording medium is provided. According to the embodiment, a first sub-layer of a magnetic layer is formed on a substrate, the magnetic layer including a magnetic material and a plurality of non-magnetic segregants, a top surface of the first sub-layer is etched to substantially remove the non-magnetic segregants accumulated on the top surface, and a second sub-layer of the magnetic layer is formed on the first sub-layer.

According to another embodiment of the present invention, a magnetic recording medium is provided. According to the embodiment, the magnetic recording medium includes a substrate and a magnetic recording layer on the substrate, the magnetic recording layer including a magnetic material and a plurality of non-magnetic segregants. In the embodiment, the magnetic material includes a plurality of grains having substantially continuous columnar crystal growth. In one embodiment, the magnetic recording layer has a thickness of t, a diameter of the plurality of grains is D, and a ratio of t/D may be greater than 1.

BRIEF DESCRIPTION OF THE DRAWINGS

The above and other features and aspects of the present invention will become more apparent by describing in detail embodiments thereof with reference to the attached drawings in which.

DETAILED DESCRIPTION

Figure 1:
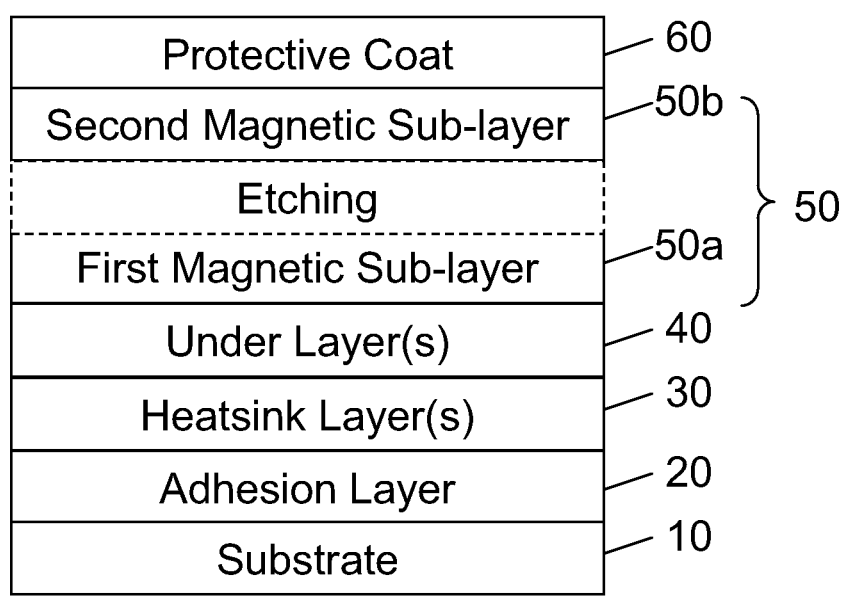
FIG. 1 illustrates a cross-sectional functional view of a layer stack of a magnetic recording medium for energy assisted magnetic recording (EAMR) according to an embodiment of the present invention.

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention.

FIG. 1 illustrates a layer stack of a magnetic recording medium for energy assisted magnetic recording (EAMR). Referring to FIG. 1, the magnetic recording medium includes a substrate 10, an adhesion layer 20 on the substrate 10, one or more heatsink layers 30 on the adhesion layer 20, one or more under layers 40 on the heatsink layers 30, a magnetic layer 50 on the under layers 40, and a protective coat on the magnetic layer 50. The substrate 10 may be a glass substrate, a metal substrate, or any other suitable substrates. The adhesion layer 20 may include CrTa, NiP, NiTa, or other suitable materials. The one or more heatsink layers 30 may include Cu, W, Ru, Mo, Ag, Au, Cr, Mg, Rh, Be, or alloys thereof, or other suitable materials. The one or more under layers 40 may include MgO, TiN, TiC, AlRu, VC, HfC, ZrC, TaC, NbC, CrC, NbN, CrN, VN, CoO, FeO, CaO, NiO, MnO, or other suitable materials.

In FIG. 1, the magnetic layer 50 includes a first magnetic sub-layer 50a and a second magnetic sub-layer 50b. The second magnetic sub-layer 50b is formed on the first magnetic sub-layer 50a after performing an etching process on the first magnetic sub-layer 50a. The etching process removes an accumulation of segregants such as carbon on a top surface of the first magnetic sub-layer 50a. The accumulation of segregants will be discussed below in more details. Each of the first and second magnetic sub-layers (50a and 50b) may include a magnetic material such as Fe, Co, and/or combinations thereof, according to several embodiments of the present invention. For example, the magnetic material may include FePt, FePd, CoPt, or other suitable materials. In one embodiment, the magnetic layer 50 has a ratio of t/D greater than 1, where t is a thickness of the magnetic layer 50, and D is a diameter of the grains of the magnetic layer 50.

In one embodiment, the magnetic layer 50 includes L10 FePt, and the under layers 40 include MgO on which FePt can grow with the desired texture. The substrate 10 can be a high temperature glass substrate or a metal substrate that facilitates the growth of the layers formed thereon for obtaining a good crystallographic texture growth for L10 FePt. In order to grow the FePt magnetic layer, carbon is added to segregate the grains of FePt because FePt and carbon are immiscible.

While not bound by any particular theory, when an FePt layer is grown to be thicker than a certain thickness (e.g., about 5 nm), a layer of carbon forms on a top surface of the formed FePt layer. The carbon layer will decouple the FePt grains vertically when the FePt layer is grown to be thicker than the certain thickness. It was found that carbon atoms cover the top of the FePt grains after the FePt layer is grown to the certain thickness, thus preventing the columnar growth of the FePt grains. Therefore, when the thickness of the FePt layer is grown to be thicker than, e.g., about 5 nm, an upper FePt layer is separated from a bottom FePt layer by a layer of carbon formation between the upper FePt layer and the bottom FePt layer. This phenomenon makes the epitaxial columnar growth of the FePt layer very difficult above a certain thickness (e.g., 5 nm). As such, the control of grain distributions and magnetic properties of the magnetic layer become difficult.

Figure 2:
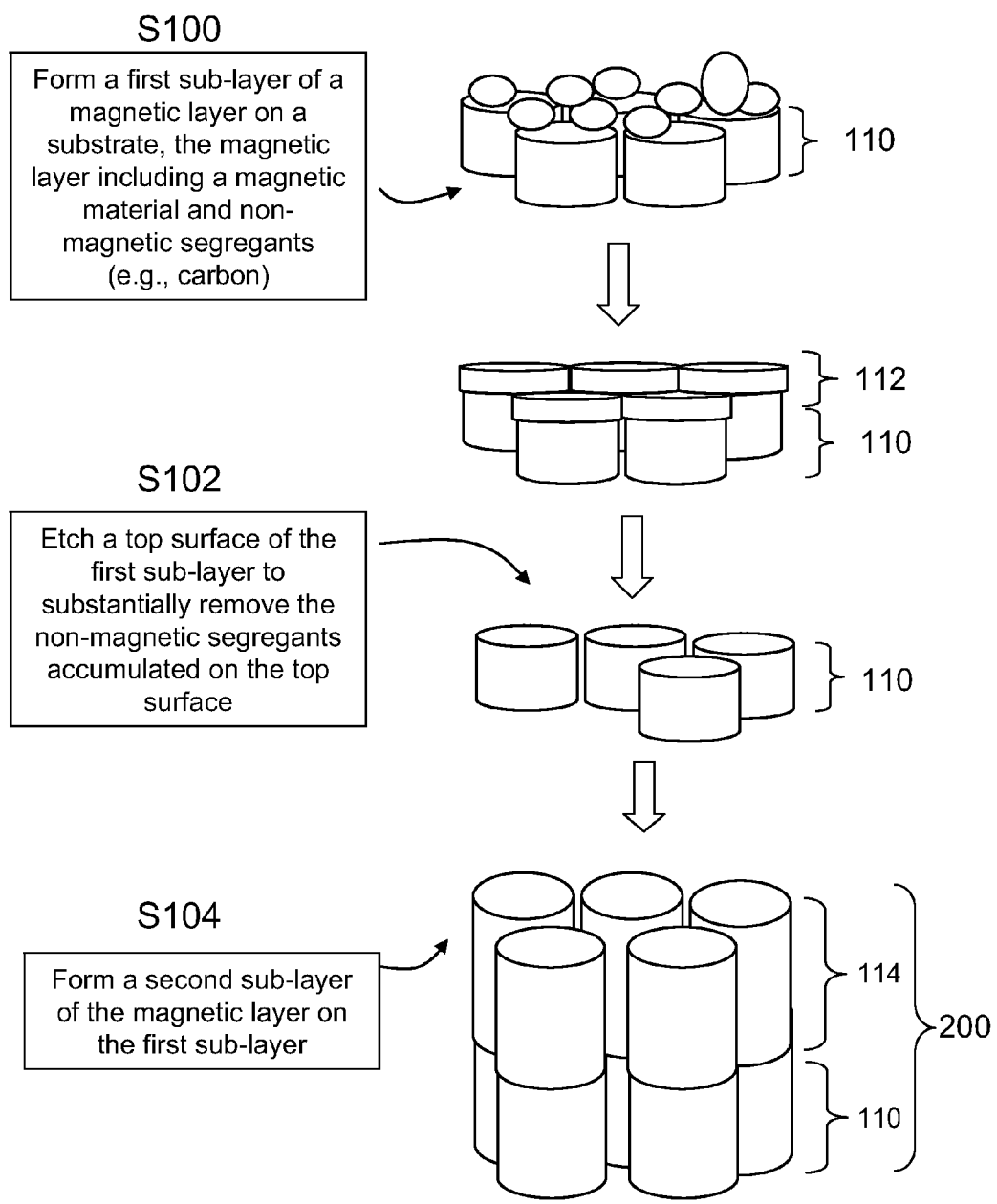
FIG. 2 conceptually illustrates a process for fabricating an EAMR medium with an elongated columnar grain structure without the formation of an undesirable layer of segregant particles, according to an embodiment of the present invention.

FIG. 2 conceptually illustrates a process for fabricating an EAMR medium with an elongated columnar grain structure without the formation of an undesirable layer of segregant particles (e.g., C), according to an embodiment of the present invention. Referring to FIG. 2, in a block S100, the process forms a first sub-layer 110 of a magnetic layer (e.g., FePt layer) on a suitable substrate (not shown in FIG. 2), where the magnetic layer includes a magnetic material (e.g., FePt) and non-magnetic segregants (e.g., C, Cr, B, $SiO_2$, $TiO_2$, $Cr_2O_3$, Ag, BN, $V_2O_5$, $ZrO_2$, $Nb_2O_5$, $HfO_2$, $Ta_2O_5$, $WO_3$, MgO, $B_2O_3$, ZnO, etc.). The first sub-layer 110 is grown to a preselected thickness (e.g., 5 nm). At this preselected thickness, a segregant layer 112 (e.g., carbon layer) forms on the top surface of the first sub-layer 110. The presence of this undesirable segregant layer 112 prevents further vertical columnar growth of grains of the magnetic layer because the segregant layer 112 decouples the magnetic grains vertically.

Still referring to FIG. 2, in block S102, the process etches a top surface of the first sub-layer 110 to substantially remove the segregants accumulated on the top surface. The segregant layer 112 can be etched away by a suitable etching process. During the etching process of the first sub-layer 110, a portion of the first sub-layer 110 proximate to the top surface is removed. The removed portion of the first sub-layer 110 has a concentration of the segregants higher than that of the other portions of the first sub-layer 110. In one embodiment, an inductively coupled plasma (ICP) etching process can be used to etch out the segregant layer 112 to expose the grains of the first sub-layer 110 below. The ICP etching process can be performed with an ICP etch gas mixture selected from the group consisting of Ar, $H_2$, $O_2$, Xe, Ne, $N_2$, and other suitable etching gases. However, the present invention is not limited to the above described etching process, and other suitable etching processes, such as ion milling, sputter etching, reactive ion etching, etc., may be used in various embodiments.

Still referring to FIG. 2, in block S104, after the removal of the segregant layer 112, the process grows a second sub-layer 114 of the magnetic layer on the exposed grains of the etched first sub-layer 110 to increase the total thickness of the resultant magnetic layer. Because the segregant layer 112 has been removed by etching, a thicker magnetic layer 200 can be fabricated (e.g., greater than 5 nm or 7 nm) with continuous columnar growth than if the segregant layer 112 were not removed. In several embodiments of the present invention, the magnetic layer 200 include FePt that can be grown from about 10 nm to about 15 nm in thickness with good epitaxy. According to the embodiment of FIG. 2, the resultant magnetic layer (i.e., FePt layer) can have a ratio of t/D greater than about 1, where t is the thickness of the magnetic layer and D is a diameter of the FePt grains.

In several embodiments, the magnetic layer 200 include FePt that has grain sizes between about 4 nm and about 9 nm in diameter, inclusive. In other embodiments, the magnetic layer 200 include FePt that has grain sizes between 5 nm and about 6 nm, inclusive. In several embodiments, the first sub-layer 110 has a thickness between about 3 nm and about 6 nm, inclusive, and the second sub-layer 114 has a thickness between about 3 nm and about 10 nm, inclusive. In several embodiments, the first sub-layer 110 has a thickness between about 3 nm and about 4 nm, inclusive. It should be appreciated that the above described materials and processes used for forming the EAMR medium are illustrative only, and the present invention is not limited thereto. In several embodiments, the EAMR medium may include other suitable magnetic materials and segregants.

In some embodiments, the above described processes can be used to form additional sub-layers of the magnetic layer 200. For example, after forming the second sub-layer 114, a top surface of the second sub-layer 114 can be etched to substantially remove a second segregant layer (not shown in FIG. 2) accumulated on the top surface of the second sub-layer 114. Then, a third sub-layer (not shown) of the magnetic layer 200 is formed on the second sub-layer 114. In addition, an adhesion layer, a heatsink layer, and an under-layer can be formed between the magnetic layer 200 and the substrate.

In the above described embodiments, the process or method can perform the sequence of actions in a different order. In another embodiment, the process or method can skip one or more of the actions. In other embodiments, one or more of the actions are performed simultaneously or concurrently. In some embodiments, additional actions can be performed.

According to the above described embodiments of the present invention, magnetic layers with smaller grain sizes can be grown thicker to provide sufficient read-back signal and good signal-to-noise ratio (SNR). Also, the above described processes can significantly improve the surface roughness of a magnetic medium.

While the present invention has been particularly shown and described with reference to exemplary embodiments thereof, it will be understood by those of ordinary skill in the art that various changes in form and details may be made therein without departing from the spirit and scope of the present invention as defined by the following claims and their equivalents.

What is claimed is:

1. A method for fabricating a magnetic recording medium to increase a thickness of a magnetic recording layer of the magnetic recording medium, the method comprising:
   forming a first sub-layer of the magnetic recording layer on a substrate, the magnetic recording layer comprising a magnetic material and a plurality of non-magnetic segregants, wherein the forming the first sub-layer of the magnetic recording layer causes the non-magnetic segregants to accumulate over the magnetic material and at a top surface of the first sub-layer;
   etching the top surface of the first sub-layer to remove substantially all of the non-magnetic segregants accumulated at the top surface; and
   forming a second sub-layer of the magnetic recording layer on the first sub-layer.

2. The method of claim 1, wherein the forming of the second sub-layer of the magnetic recording layer comprises continuing a columnar crystal growth of the magnetic recording material from the first sub-layer.

3. The method of claim 1, wherein the etching the top surface of the first sub-layer comprises removing a portion of the first sub-layer proximate to the top surface.

4. The method of claim 3, wherein the portion of the first sub-layer proximate to the top surface has a concentration of the non-magnetic segregants higher than that of the other portions of the first sub-layer.

5. The method of claim 1, wherein the etching is performed by an etching process selected from the group consisting of inductively coupled plasma (ICP) etching, ion milling, sputter etching, reactive ion etching, and combinations thereof.

6. The method of claim 5:
wherein the etching is performed by inductively coupled plasma (ICP) etching; and
wherein the ICP etching is performed with an ICP etch gas mixture selected from the group consisting of Ar, $H_2$, $O_2$, Xe, Ne, and $N_2$.

7. The method of claim 1, wherein the magnetic recording material comprises a material selected from the group consisting of Fe, Co, Ni, and combinations thereof.

8. The method of claim 7, wherein the magnetic recording material comprises FePt.

9. The method of claim 1, wherein the plurality of non-magnetic segregants comprise a material selected from the group consisting of C, Cr, B, $SiO_2$, $TiO_2$, $Cr_2O_3$, Ag, BN, $V_2O_5$, $ZrO_2$, $Nb_2O_5$, $HfO_2$, $Ta_2O_5$, $WO_3$, MgO, $B_2O_3$, ZnO, and combinations thereof.

10. The method of claim 9, wherein the plurality of non-magnetic segregants comprise carbon.

11. The method of claim 1, wherein the magnetic recording material has grain sizes between about 4 nm and about 9 nm in diameter, inclusive.

12. The method of claim 11, wherein the magnetic recording material has grain sizes between about 5 nm and about 6 nm in diameter, inclusive.

13. The method of claim 1, wherein the first sub-layer has a thickness between about 3 nm and about 6 nm, inclusive, and the second sub-layer has a thickness between about 3 nm and about 10 nm, inclusive.

14. The method of claim 13, wherein the first sub-layer of the magnetic recording layer has a thickness between about 3 nm and about 4 nm, inclusive.

15. The method of claim 1, further comprising:
etching a top surface of the second sub-layer to substantially remove the non-magnetic segregants accumulated at the top surface of the second sub-layer; and
forming a third sub-layer of the magnetic layer on the second sub-layer.

16. The method of claim 1, wherein a ratio of a thickness of the magnetic recording layer to a grain diameter of the magnetic material is greater than 1.

17. The method of claim 1, further comprising forming, between the magnetic recording layer and the substrate, an adhesion layer on the substrate, a heat sink layer on the adhesion layer, and an under-layer on the heat sink layer.

18. The method of claim 1, further comprising forming a protective coating layer directly on the second sub-layer.

19. The method of claim 1, wherein the magnetic recording layer is configured to record information.

\* \* \* \* \*